(12) United States Patent
Risan

(10) Patent No.: US 7,720,768 B1
(45) Date of Patent: May 18, 2010

(54) ENHANCING COPYRIGHT REVENUE GENERATION FOR A COPYRIGHT PROTECTED FRAME-BASED WORK

(75) Inventor: Hank Risan, Santa Cruz, CA (US)

(73) Assignee: Media Rights Technologies, Inc., Santa Cruz, CA (US)

( * ) Notice: Subject to any disclaimer, the term of this patent is extended or adjusted under 35 U.S.C. 154(b) by 0 days.

(21) Appl. No.: 12/424,420

(22) Filed: Apr. 15, 2009

(51) Int. Cl.
*G06F 21/00* (2006.01)

(52) U.S. Cl. .............................. 705/59; 705/57; 705/58; 705/51; 705/52

(58) Field of Classification Search .................... 705/59, 705/57, 58, 51, 52
See application file for complete search history.

(56) References Cited

U.S. PATENT DOCUMENTS

2005/0192815 A1    9/2005  Clyde
2007/0130074 A1*   6/2007  Goldstein ..................... 705/51
2008/0089202 A1*   4/2008  Robinson et al. ......... 369/53.21

* cited by examiner

*Primary Examiner*—Pierre E Elisca

(57) ABSTRACT

A method for enhancing copyright revenue generation for a copyright protected frame-based work. The method includes embedding copyright and playback management information into at least one data field of the copyright protected frame-based work. The copyright and playback management information corresponds to access to the copyright protected frame-based work. The method also includes encoding the copyright protected frame-based work, transmitting the encoded copyright protected frame-based work and ensuring appropriate payment of entitled copyright royalties of the copyright protected frame-based work based at least in part on the embedded copyright and playback management information.

19 Claims, 4 Drawing Sheets

200

```
Embed copyright and playback management information into at least one data field of the
copyright protected frame-based work. The copyright and playback management
information corresponds to access to said copyright protected frame-based work.
210
```

- Embed the copyright and playback management information into at least one application-private bit of at least one corresponding frame of a MP3 file
  211
  - embed the copyright and playback management information into a sequence of a plurality of application-private bits
    212
  - repeatedly and continuously embed the copyright and playback management information into a sequence of a plurality of application-private bits
    213

- embed a version number of said work
  214
- embed no copying allowed for said work
  215
- embed the number of copies allowed for said work
  216
- embed the number of plays allowed for said work
  217

Encode the copyright protected frame-based work
220

Transmit the encoded copyright protected frame-based work
230

- Transmit the encoded copyright protected frame-based work to a device. The device decodes the embedded copyright and playback management information to facilitate in the ensuring appropriate payment of entitled copyright royalties of the copyright protected frame-based work.
  235

Ensure appropriate payment of entitled copyright royalties of the copyright protected frame-based work based at least in part on the embedded copyright and playback management information
240

Select an audio frequency not usually perceived by a listener of the copyright protected work. The copyright protected work is a frameless work.
410

---

Encode copyright and playback management information within the selected audio frequency not usually perceived by a listener of the copyright protected work.
420

---

Transmit the encoded copyright protected frameless work.
430

---

Ensure appropriate payment of entitled copyright royalties of the copyright protected frameless work based at least in part on the encoded copyright and playback management information.
440

ENHANCING COPYRIGHT REVENUE GENERATION FOR A COPYRIGHT PROTECTED FRAME-BASED WORK

FIELD

Embodiments of the present technology relates generally to the field of copyright revenue.

BACKGROUND

Downloading media over the Internet is quite popular. End users often download one's favorite songs so the end user may listen to the songs repeatedly at his/her convenience. The media being transmitted to the end user often has copyright protection under Title 17 of the United States Code. If the downloaded media is copyright protected, copyright royalties may be required to legally transmit and subsequently download the media. Accordingly, a media provider that provides a large database of media may transmit large volumes of copyrighted media and may be required to pay large royalty fees.

Moreover, the copyright owner of the copyright protected media has an interest in protecting the copyright protected media from counterfeit works and also has a financial interest in receiving the proper copyright royalties for the use of the copyright protected media. Additionally, the copyright owner has legal standing to require media device manufacturers to protect copyright with technological measures.

SUMMARY

A method for enhancing copyright revenue generation for a copyright protected frame-based work. The method includes embedding copyright management information (and optional playback management information) into at least one data field of the copyright protected frame-based work. The copyright and playback management information correspond to access to the copyright protected frame-based work. The method also includes encoding the copyright protected frame-based work, transmitting the encoded copyright protected frame-based work and ensuring appropriate payment of entitled copyright royalties of the copyright protected frame-based work based at least in part on the embedded copyright and playback management information. It should also be appreciated that the method includes activating a Serial Copy Management System (SCMS).

BRIEF DESCRIPTION OF THE DRAWINGS

FIG. 2 illustrates an example of a flow chart of a method for enhancing copyright generation, in accordance with an embodiment of the present invention.

FIG. 4 illustrates an example of a flow chart of a method for enhancing copyright generation, in accordance with an embodiment of the present invention.

Figure 1:
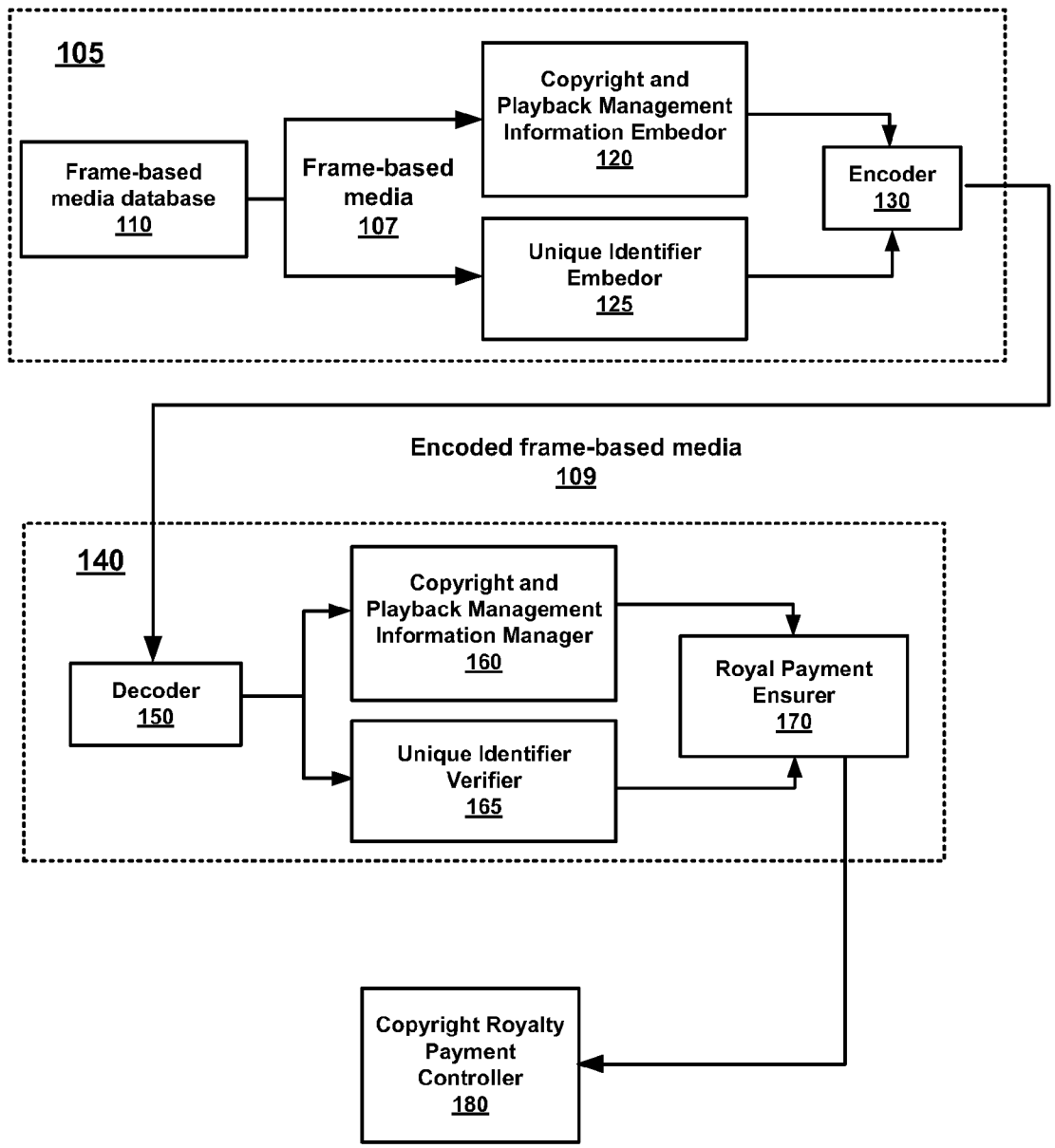
FIG. 1 illustrates an example of a system for enhancing copyright revenue generation, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Under 17 U.S.C. 106 and 114, an owner of copyright in a sound recording has exclusive rights to the sound recording. For example, the copyright owner is limited to the right to duplicate the sound recording in certain forms that directly or indirectly recapture the actual sounds fixed in the recording. Also, the copyright owner is limited to the right to prepare a derivative work in which the actual sounds fixed in the sound recording are rearranged, remixed, or otherwise altered in sequence or quality.

However, there are certain limitations to the rights in the sound recordings. In particular, the exclusive rights of the owner of copyright in a sound recording do not extend to the making or duplication of another sound recording that consists entirely of an independent fixation of other sounds, even though such sounds imitate or simulate those in the copyrighted sound recording. In other words, copyright law allows one to create an imitation or simulation of a copyrighted sound recording as long as the imitated or simulated sounds are independently created.

Copyright law also requires a plurality of copyright royalties paid to the copyright owner for the use of copyrighted work, such as but not limited to performance royalties and publishing royalties. The royalty rates are set by the Copyright Royalty Board. In order for a copyright owner to enforce and collect copyright royalties, the copyright owner must have a valid copyright that is registered with the United States Copyright Office. A way to protect a copyright protected work and ensure payment of copyright royalties is through the use of technological measures that effectively control access to the copyright protected work, as described in 17 U.S.C. 1201.

A copyright owner of a copyright protected work must have legal standing to pursue a claim of copyright infringement. Distribution is a key element of standing for copyright infringement under Title 17. For example, when a copyright protected work having technological measures (e.g., SCMS) for the protection of the copyright protected work is distributed, any device or appliance that subsequently accepts and renders the copyright protected work is required to have technological measures in place (e.g., SCMS) so as to effectively control access to the copyrighted work and maintain the integrity of the copy controls, and copy management information on the work itself as required in section 1201, 1202 and 1001 of the Title 17.

A media provider, such as a media web broadcaster, that provides a large database of media, such as but not limited to sound recordings, may transmit large volumes of copyrighted media and may be required to pay large amounts of royalty fees. An embodiment in accordance with the present invention provides a system 100 for enhancing copyright revenue generation, as illustrated in FIG. 1. System 100 includes a system 105, a device 140 and a copyright royalty payment controller 180. The system 105 includes a frame-based media database 110, a copyright and playback management information embedor 120, a unique identifier embedor 125 and an encoder 130.

The system 105 facilitates in the enhancing of copyright revenue generation by facilitating in the ensuring of appropriate payment of entitled copyright royalties. In one embodiment, the system 105 is a web broadcaster that broadcasts multimedia via the Internet. It should be appreciated that the multimedia is any frame-based media 107 which is stored in a frame-based media database 110. In one embodiment, the frame-based media 107 are MPEG-1 Audio Layer 3 (MP3) files.

In one embodiment, the system 105 facilitates the ensuring of appropriate payment of entitled copyright royalties of copyright works by introducing technological measures to the a copyright protected frame-based media 107 by way of copyright and playback management information embedor 120. In another embodiment, the system 105 facilitates the ensuring of appropriate payment of entitled copyright royalties of copyright works by introducing technological measures to the copyright protected frame-based media 107 by way of unique identifier embedor 125. It should be appreciated that a technological measure effectively controls access to a copyright protected work if the measure, in the ordinary course of operation, requires the application of information, or a process or treatment, with the authority of the copyright owner, to gain access to the copyright protected work. One purpose of technological measures it so help prevent counterfeit works.

It should be appreciated that the copyright and playback management information can be but is not limited to a SCMS. SCMS is a scheme to protect copyrights of digital productions by preventing data from being repeatedly copied. SCMS is built into an audio appliance which has a function to create a copy of digital data, such as an MP3 file. The audio appliance with the SCMS built into it can prevent a first-generation copy recorded by the user from being copied again. In other words, the SCMS prevents a second or higher generation copy from being created.

However, SCMS does not prevent users from making numerous first generation copies. As a result, the implementation of SCMS in devices that copy digital data does not stop users of such devices from making any number of first generation copies that may end up being distributed illegally.

Copyright and playback management information embedor 120 embeds copyright and playback management information within frame-based media 107. It should be appreciated that the copyright and playback management information is any information related to the management and/or the enforcement of copyright protection associated with a copyright protected work. In various embodiments, the copyright and playback management information can be but is not limited to the number of copies allowed of the frame-based media, the number of copies allowed of the frame-based media, version number of the frame-based media or no copies allowed, rules for subsequent copies and the like, as well as the number of plays allowed of the frame-based media and the types of devices that are allowed to play the media.

In various embodiments, the copyright management information indicates which machine, product and/or company the copyright protected work came from. Additionally, the copyright management information indicates which machine, product and/or company the copyright protected work is allowed to be played back on.

It should also be appreciated that the copyright management information is forensics related information, such as but not limited to tracking information. For example, a demo of a copyright protected work is released to person "A." The copyright protected work has an embedded unique number that is associated with person "A." If the content of the demo is found elsewhere (e.g., not with person "A"), the content of the demo can be tracked back to its source.

Further, the copyright management information is an expiration date(s) associated with the copyright protected work. For example, the expiration date(s) associated with the copyright protected work is embedded in the copyright protected work and subsequently limits when the copyright protected work is able to be played back.

It should be appreciated that the copyright and playback management information embedor 120 embeds copyright and playback management information within at least one data field of the frame-based media 107. In one embodiment, the data field is an application-private bit of a MP3 file. Typically, MP3 files are segmented into thousands of frames. For example, a three to five minute song can have approximately 8,000 to 12,000 frames. Each frame contains a fraction of a second's worth of audio data. At the beginning of every data frame is a header frame which stores 32 bits of meta-data related to the coming data frame. The MP3 header begins with a sync block that consists of 11 bits. The sync block allows players to search for and lock onto the first available occurrence of a valid frame. Following the sync block are a plurality of other header blocks that facilitate in the proper decoding and subsequent playing of the MP3 file. One of the other header blocks is the application-private bit, which allows for application-specific triggers. For example, if there are 8,000 frames in an MP3 file, there is a private bit corresponding to each frame for a total of 8,000 private bits.

In one embodiment, the copyright and playback management information is a multiple bit data structure using the application-private bits in the MP3 frame headers across consecutive audio frames. For example, if the copyright and playback management information contains 32 bits, then each bit is stored in 32 consecutive application-private bits in corresponding 32 consecutive frames. In particular, the first bit of the copyright and playback management information is stored in the application-private bit of the header for the first audio frame. The second bit of the copyright and playback management information is stored in the application-private bit of the second audio frame and so on until all the data in the copyright and playback management information is stored in consecutive frames.

Further, the sequence of bits associated with the copyright and playback management information data block is continuously repeated throughout the entire audio file. Once the entire data block has been encoded, the first bit of the copyright and playback management information data block is stored in the application-private bit of the header for the next frame within the MP3 file. Accordingly, the playback application is able to detect the copyright and playback management information for the audio file irrespective of the starting position within the file from which the playback was initiated. For example, if the MP3 file has 8,000 frames and a corresponding 8,000 application private bits, then a copyright and playback management information data block of 32 bits is initially stored in the first 32 consecutive application-private bits and repeatedly stored in consecutive application-private bits, for a total of 250 consecutive and repeated instances of the copyright and playback management information data block stored in the entire MP3 file.

In one embodiment, the copyright and playback management information (CMI) is a 32-bit data structure having the following format. It should be appreciated that the 32-bit data structure is a SCMS data structure used to encode playback rights information in addition to copy control information. For example, a copyright holder may choose to allow a particular work to be played freely a certain number of times before requiring a license key or other access mechanism.

Elements of the 32-bit data structure are shown in Table 1:

| Offset | Description |
| --- | --- |
| 0 | First byte of CMI, set to fixed value to facilitate detection by a playback or secure copy application |
| 8 | Second byte of CMI, set to fixed value to facilitate detection by a playback or secure copy application |
| 16 | Version number of CMI (three binary bits) |
| 19 | Flag indicating copying not allowed for audio file |
| 20 | If bit at offset 19 is not set, number of copies allowed for file (up to a maximum of 15). A value binary 0000 indicates that the file may be freely copied. |
| 24 | Number of plays allowed for file (up to a maximum of 255). If this field is set to binary 00000000, the file can be freely played. |

Additional security is available by using an encryption mechanism. Specifically, an encoder generates one or more sequences of data bytes to be used as keys for the encoding of the audio data for the file. The key sequences can be derived from a cryptographically secure digest taken across all or part of the data for the file. Thus, the key sequences are most likely different for each audio file.

The key sequences that are used for the encryption for all or part of the SCMS data block are unique to each copyright protected work. The key sequences can be generated using data from the copyright protected work. Thus the SCMS data block can be used to help ensure the integrity and authenticity of the copyright protected work.

It should be appreciated that to allow playback devices to more easily detect the presence of copyright and playback management information, the two marker bytes for each copyright and playback management information data block can be left unencoded.

It should be appreciated that stronger cryptographic algorithms impose the restriction that the data blocks to be processed must have sizes that are multiples of eight bytes or more. As such, the logic within the playback device to validate the copyright and playback management information could be complicated in nature.

In one embodiment, system 105 facilitates in the ensuring of appropriate payment of entitled copyright royalties of the copyright protected frame-based media 107 by adding technological measures to the frame-based media via unique identifier embedor 125. Unique identifier embedor 125 embeds at least one unique identifier into a frame-based media, such as but not limited to a MP3 file. It should be appreciated that the at least one unique identifier is invariant. In one embodiment, at least one unique identifier is embedded into metadata of an MP3 file, such as but not limited to an ID3V2 tag.

Further, at least one unique identifier is a valid copyright registration number from the United States Copyright Office associated with copyright protected frame-based media 107. Copyright registration establishes a public record of a copyright claim. A registration of a song with the United States Copyright Office could have a plurality of copyright registration numbers associated with the copyrighted song. For example, a song registered with the United States Copyright Office could have one copyright registration number for the lyrics of the song and the same song could have a different copyright registration number for the performance of the song. In another embodiment, at least two copyright registration numbers are embedded into ID3V2 tags of an MP3 file. It should be appreciated that the copyright registration numbers are any valid copyright registration numbers associated with the MP3 file, such as but not limited to copyright registration numbers associated with a simulation, an independent work of authorship, lyrics and the like. It should be appreciated that the embedding of at least one unique identifier is to help prevent tampering and counterfeiting of the frame-based media.

System 105 encodes the frame-based media subsequent to the copyright and playback management information embedor 120 embedding copyright and playback management information into the frame-based media 107 and/or the unique identifier embedor 125 embedding at least one unique identifier into the frame-based media 107. It should be appreciated that the encoding of the copyright and playback management information that is embedded into the frame-based media 107 does not alter the audio data in any way and does not compromise the integrity of the original work or simulation. Upon request by an end user, system 105 transmits encoded frame-based media 109 to media device 140.

Transcoding can be performed on a frame-based media that results in frameless media. For example, an MP3 file can be transcoded into another format (e.g., way, AC3), such that it loses its frames, header, footer and as a result all that is left are the payloads. In a frameless media file, the copyright and playback information can be encoded by employing watermarking techniques. The copyright and playback information is encoded in the frameless media file by selecting a certain frequency not usually perceived by the listener and then changing its value to reflect the copyright and playback information data. It should be appreciated that mechanisms such as watermarking techniques operate directly upon the audio data and thus affect the rendering of the work.

For example, a video file when rendered often has the audio track data shunted off to the appropriate audio components. Similarly, in a frameless audio file, some component of the audio pathway could be modified to periodically look for the copyright and playback information. If a low frequency is selected and sampled, such that there is a guaranteed match on a significant pattern, the copyright and playback information can be further read for copyright and playback rules.

Media device 140 includes a decoder 150 that decodes the encoded frame-based media 109, copyright and playback management information manager 160, unique identifier verifier 165 and royalty payment ensurer 170. It should be appreciated that media device 140 is any media device capable of reading encoded frame-based media 109 and allowing a user of media device 140 to gain access to the transmitted frame-based media, such as but not limited to an MP3 player. It should also be appreciated that the media device 140 does not circumvent a technological measure. To circumvent a technological measure means to descramble a scrambled work, to descript an encrypted work, or otherwise to avoid, bypass, remove, deactivate, or impair a technological measure, without the authority of the copyright owner.

Copyright and playback management information manager 160 manages the frame-based media 107 according to the copyright and playback information that is embedded into the frame-based media. It should be appreciated that copyright and playback management information manager 160 manages the frame-based media 107 according to any information related to the management and/or the enforcement of copyright protection associated with frame-based media 107. For example, if the copyright and playback management information is a 32-bit data structure having the format, as shown above in Table 1, the copyright and playback management information manager 160 will manage the frame-based media 107 according to the rules set forth in Table 1. It should be appreciated that the copyright and playback management information manager 160 can be but is not limited to a SCMS, as described above, and manage the frame-based media 107 according the SCMS scheme embedded into frame-based media 107.

Unique identifier verifier 165 verifies that the at least one unique identifier embedded in the decoded frame-based media is the same unique at least one unique identifier that was embedded into the frame-based media 107. In one embodiment, unique identifier verifier 165 verifies that the two copyright registration numbers associated with the MP3 file embedded in the ID3V2 tags of an MP3 file are the same two copyright registration numbers associated with the MP3 file embedded in the ID3V2 tags subsequent decoding of the MP3 file in the device 140. It should be appreciated that if the unique identifier verifier 165 determines that the at least one unique identifier decoded at device 140 is the same as the at least one unique identifier that was embedded into the frame-based media 107, then it helps determine that the decoded frame-based media 107 has not been tampered with and is not a counterfeit. It should also be appreciated that the ID3V2 tags are metadata in the MP3 frame headers, as described above.

In one embodiment, the royalty payment ensurer 170 facilitates in ensuring appropriate payment of entitled copyright royalties of the copyright protected frame-based work 107 based at least in part on the embedded copyright and playback management information. Typically, the copyright owner of a copyright protected work is entitled to copyright royalties upon the transmission of a frame-based media 107. Based at least in part upon the output of the copyright management information manager 160 and the unique identifier verifier 166, the copyright owner of the frame-based media is ensured appropriate payment of entitled royalties. For example, if the copyright and playback management information manager 160 determines that the transmission of frame-based media 107 is only allowed to be copied three times, then the copyright and playback management manager 160 only allows for three copies of the frame-based media and the royalty payment ensurer 170 tracks the amount copies made which ensures appropriate payment of entitled royalties.

Further, the royalty payment ensurer 170 facilitates in ensuring appropriate payment of entitled copyright royalties of the copyright protected frame-based work 107 based at least in part on the embedded at least one unique identifier. For example, if the frame-based work 107 is a counterfeit frame-based work, the copyright owner of the copyright protected frame-based work would not receive the entitled royalties for the transmission, use and copying of the frame-based work. If the unique identifier verifier 165 verifying that the frame-based work 107 has not been tampered with or is not a counterfeit, the royalty payment ensurer 170, accordingly, tracks the use of the non-counterfeit frame-based work 107 and the copyright owner is then is ensured the proper entitled royalties for the use of the copyright protected work.

In general, if a copyrighted sound recording is transmitted to a user, the party transmitting the copyrighted sound recording is required to pay copyright royalties for the transmitted sound recording. The entitled copyright royalties can be but are not limited to a performance royalty and a publishing royalty. Generally, the performance is paid to the performers of the sound recording. The publishing royalty is paid to the songwriter of the lyrics of the song. Accordingly, if a party transmits an independent work of authorship, such as but not limited to a simulation, and the party owns the copyright of the independent work of authorship, the party is not required to pay a performance royalty that would otherwise have been paid to the prior owner of the copyright of the copyrighted media recording. However, the copyright owner of the independent work of authorship is required to pay a publishing royalty to the songwriter of the sound recording who wrote the lyrics to the sound recording and is entitled to a performance royalty for the imitated or simulated work performed. Therefore, there is an enhancing of copyright revenue generation because the party transmitting the independent work of authorship is entitled to copyright royalties (e.g. performance royalties) thereon that would have otherwise have been paid to the owner of the of the copyright of the copyrighted media recording. Additionally, not only will the independent work of authorship be subject to generating royalties, it is subject to registration for copyright protection.

Currently, for example, Apple Inc. of Cuppertino, Calif., provides for copyrighted songs to be purchased on iTunes Store, an online digital media store, and played on iTunes, a digital media player application. Apple Inc. initially obtains sufficient rights to a song that is provided for purchase and download at the iTunes Store. Upon purchase and download of the song to an end user, Apple Inc. is required to pay copyright royalties of the transmitted copyright song, such as but not limited to performance and publishing royalties. If Apple Inc. sells one copyrighted song to an end user for $1, Apple Inc. is currently required to pay approximately a $0.70 performance royalty and a $0.09 publishing royalty. If however an online digital store, such as iTunes Store, created an independent work of authorship, such as but not limited to a simulation, and retained a copyright for the independent work of authorship, Apple Inc. would not be required to pay the performance royalty of a copyrighted song (e.g., $0.70) but instead could charge a performance royalty which would enhance the copyright revenue generation of Apple Inc. Nevertheless, Apple Inc. does not create an independent work of authorship from a copyrighted media recording and is currently required to pay at least a performance and publishing royalty for each song transmitted to an end user.

The copyright royalty payment controller 180 receives information from the device 140 and pays the copyright owner of the copyright protected work for the use of the copyright protected work accordingly. It should be appreciated that the copyright royalty payment controller 180 can be but is not limited to a performing rights organization (e.g., The American Society of Composers, Authors and Publishers, Broadcast Music, Inc., SESAC, Inc. and SoundExchange) and/or mechanical rights agency (e.g., Harry Fox Agency and Canadian Mechanical Rights Reproduction Agency).

FIG. 2 is a flowchart illustrating a process 200 for enhancing copyright revenue generation. In one embodiment, process 200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 200 is performed at least by system 105 of FIG. 1. It should be appreciated that system 105 could be a machine or computer that at least includes frame-based media database 110, copyright and playback management information embedor 120, unique identifier embedor 125 and encoder 130.

At block 210 of FIG. 2, copyright and playback management information is embedded into at least one data field of the copyright protected frame-based work. The copyright and playback management information corresponds to access to the copyright protected frame-based work. In one embodiment, at block 211, the copyright and playback management information is embedded into at least one application-private bit of at least one corresponding frame of a MP3 file. In another embodiment, at block 212, the copyright and playback management information is embedded into a sequence of a plurality of application-private bits. In another embodiment, at block 213, the copyright and playback management information is repeatedly and continuously embedded into a sequence of a plurality of application-private bits.

At block 214, the copyright and playback management information is a version number of the work. At block 215, the copyright and playback management information is no copying allowed of the work. At block 216, the copyright and playback management information is a number of copies allowed for the work. At block 217, the copyright and playback management information is a number of plays allowed for the work.

At block 220, the copyright protected frame-based work is encoded. At block 230, the encoded copyright protected frame-based work is transmitted. In one embodiment, at block 235, the encoded copyright protected frame-based work is transmitted to a device. The device decodes the embedded copyright and playback management information to facilitate in the ensuring appropriate payment of entitled copyright royalties of the copyright protected frame-based work. At block 240, appropriate payment of entitled copyright royalties of the copyright protected frame-based work is ensured based at least in part on the embedded copyright and playback management information.

Figure 3:
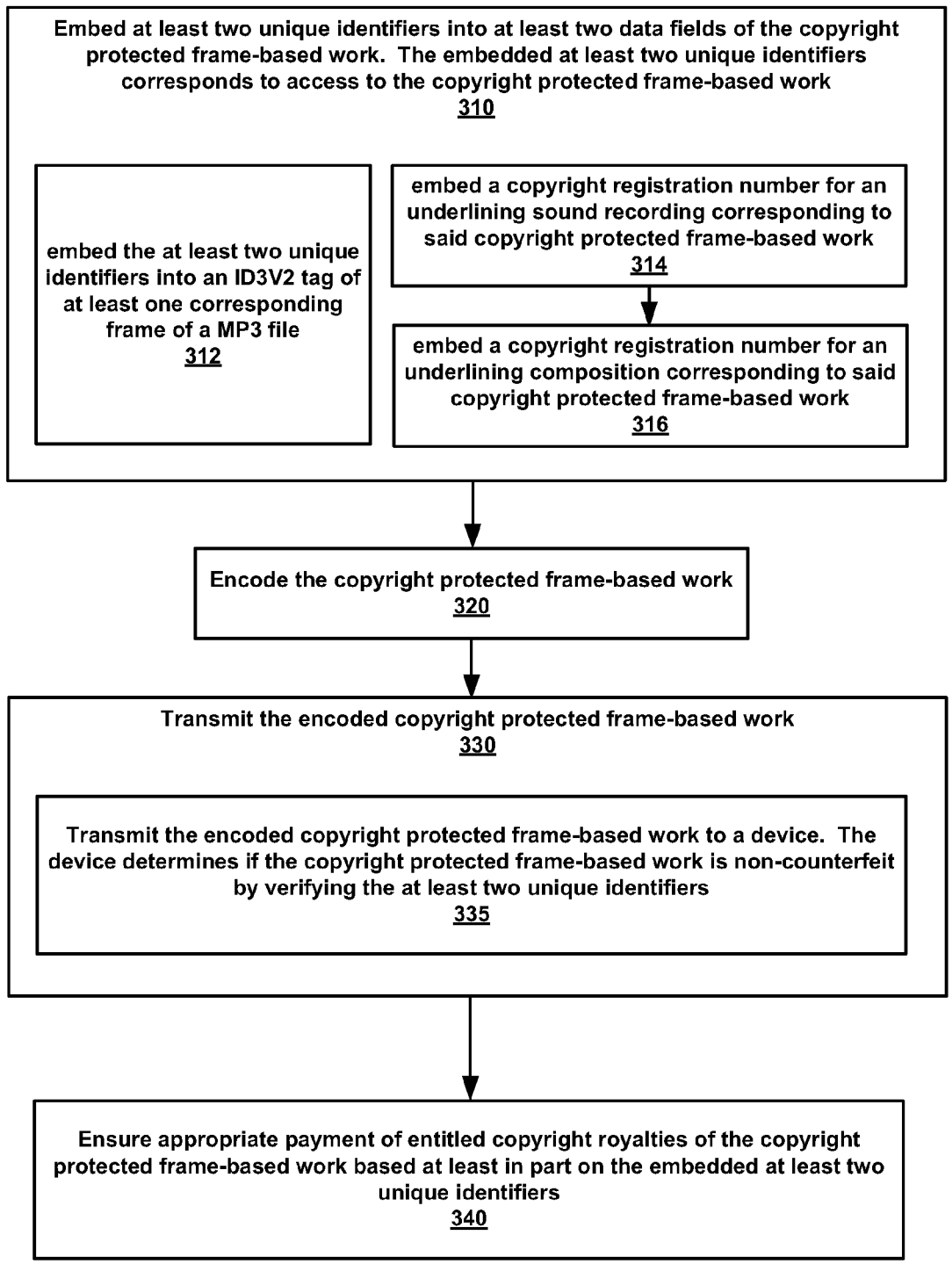
FIG. 3 illustrates an example of a flow chart of a method for enhancing copyright generation, in accordance with an embodiment of the present invention.

FIG. 3 is a flowchart illustrating a process 300 for enhancing copyright revenue generation. In one embodiment, process 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 300 is performed at least by system 105 of FIG. 1. It should be appreciated that system 105 could be a machine or computer that at least includes frame-based media database 110, copyright and playback management information embedor 120, unique identifier embedor 125 and encoder 130.

At block 310, at least two unique identifiers are embedded into at least two data fields of the copyright protected frame-based work. The embedding of the at least two unique identifiers corresponding to access to the copyright protected frame-based work. In one embodiment, at block 312, the at least two unique identifiers are embedded into an ID3V2 tag of at least one corresponding frame of a MP3 file. In another embodiment, at block 314, a copyright registration number for an underlining sound recording corresponding to the copyright protected frame-based work is embedded into the frame-based work. At block 316, a copyright registration number for an underlining composition corresponding to the copyright protected frame-based work is embedded into the frame-based work.

At block 320, the copyright protected frame-based work is encoded. At block 330, the encoded copyright protected frame-based work is transmitted. In one embodiment, at block 335, the encoded copyright protected frame-based work is transmitted to a device. The device determines if the copyright protected frame-based work is non-counterfeit by verifying the at least two unique identifiers. At block 340, appropriate payment of entitled copyright royalties of the copyright protected frame-based work is ensured based at least in part on the embedded at least two unique identifiers.

FIG. 4 is a flowchart illustrating a process 400 for enhancing copyright revenue generation. At block 410, an audio frequency is selected that is not usually perceived by a listener of the copyright protected work. The copyright protected work is a frame-based work that is transcoded to a frameless work. At block 420, copyright and playback management information is encoded within the selected audio frequency not usually perceived by a listener of the copyright protected work. At block 430, the encoded copyright protected frameless work is transmitted to an end user. At block 440, appropriate payment of entitled copyright royalties of the copyright protected frameless work is ensured based at least in part on the encoded copyright and playback management information.

Various embodiments of the present invention, (title), are thus described. While the present invention has been described in particular embodiments, it should be appreciated that the present invention should not be construed as limited by such embodiments, but rather construed according to the following claims.

The invention claimed is:

1. A computer-implemented method of enhancing copyright revenue generation for a copyright protected frame-based work, said method comprising:

embedding copyright and playback management information into at least one data field of said copyright protected frame-based work, wherein said copyright and playback management information corresponds to access to said copyright protected frame-based work at a computer, wherein said embedding copyright and playback management information comprises:

embedding a copyright registration number for an underlining sound recording corresponding to said copyright protected frame-based work; and embedding a copyright registration number for an underlining composition corresponding to said copyright protected frame-based work;

encoding said copyright protected frame-based work at said computer;

transmitting said encoded copyright protected frame-based work at said computer; and ensuring appropriate payment of entitled copyright royalties of said copyright protected frame-based work based at least in part on said embedded copyright and playback management information.

2. The computer-implemented method of claim 1, wherein said embedding copyright and playback management information into at least one data field of said copyright protected frame-based work comprises:

embedding said copyright and playback management information into at least one application-private bit of at least one corresponding frame of a MP3 file.

3. The computer-implemented method of claim 2, wherein said embedding copyright and playback management information into at least one application-private bit of at least one frame of a MP3 file comprises:

embedding said copyright and playback management information into a sequence of a plurality of application-private bits.

4. The computer-implemented method of claim 2, wherein said embedding copyright and playback management information into a sequence of application-private bits comprises:
repeatedly and continuously embedding said copyright and playback management information into a sequence of a plurality of application-private bits.

5. The computer-implemented method of claim 1, wherein said transmitting said encoded copyright protected frame-based work comprises:
transmitting said encoded copyright protected frame-based work to a device, wherein said device decodes said embedded copyright and playback management information to facilitate in said ensuring appropriate payment of entitled copyright royalties of said copyright protected frame-based work.

6. The computer-implemented method of claim 1, wherein said embedding copyright and playback management information comprises:
embedding a version number of said work.

7. The computer-implemented method of claim 1, wherein said embedding copyright and playback management information comprises:
embedding no copying allowed for said work.

8. The computer-implemented method of claim 1, wherein said embedding copyright and playback management information comprises:
embedding a number of copies allowed for said work.

9. The computer-implemented method of claim 1, wherein said embedding copyright and playback management information comprises:
embedding a number of plays allowed for said work.

10. A computer-implemented method for generating a copyright protected frame-based work, said method comprising:
embedding copyright and playback management information into at least one data field of said copyright protected frame-based work at a computer, wherein said copyright and playback management information corresponds to access to said copyright protected frame-based work, wherein said embedding copyright and playback management information comprises:
embedding a copyright registration number for an underlining sound recording corresponding to said copyright protected frame-based work; and
embedding a copyright registration number for an underlining composition corresponding to said copyright protected frame-based work;
encoding said copyright protected frame-based work at said computer;
transmitting said encoded copyright protected frame-based work at said computer; and
ensuring appropriate payment of entitled copyright royalties of said copyright protected frame-based work based at least in part on said embedded copyright and playback management information.

11. The computer-implemented method of claim 10, wherein said embedding copyright and playback management information into at least one data field of said copyright protected frame-based work comprises:
embedding said copyright and playback management information into at least one application-private bit of at least one corresponding frame of a MP3 file.

12. The computer-implemented method of claim 11, wherein said embedding copyright and playback management information into at least one application-private bit of at least one frame of a MP3 file comprises:
embedding said copyright and playback management information into a sequence of a plurality of application-private bits.

13. The computer-implemented method of claim 11, wherein said embedding copyright and playback management information into a sequence of application-private bits comprises:
repeatedly and continuously embedding said copyright and playback management information into a sequence of a plurality of application-private bits.

14. The computer-implemented method of claim 10, wherein said transmitting said encoded copyright protected frame-based work comprises:
transmitting said encoded copyright protected frame-based work to a device, wherein said device decodes said embedded copyright and playback management information to facilitate in said ensuring appropriate payment of entitled copyright royalties of said copyright protected frame-based work.

15. The computer-implemented method of claim 10, wherein said embedding copyright and playback management information comprises:
embedding a group consisting essentially of: a version number of said work, no copying allowed for said work, a number of copies allowed for said work and number of plays allowed for said work.

16. A computer-implemented method of enhancing copyright revenue generation for a copyright protected frame-based work, said method comprising:
embedding at least two unique identifiers into at least two data fields of said copyright protected frame-based work at a computer, wherein said embedding at least two unique identifiers corresponds to access to said copyright protected frame-based work and wherein said embedding at least two unique identifiers comprises:
embedding a copyright registration number for an underlining sound recording corresponding to said copyright protected frame-based work; and
embedding a copyright registration number for an underlining composition corresponding to said copyright protected frame-based work;
encoding said copyright protected frame-based work at said computer;
transmitting said encoded copyright protected frame-based work at said computer; and
ensuring appropriate payment of entitled copyright royalties of said copyright protected frame-based work based at least in part on said embedded at least two unique identifiers.

17. The computer-implemented method of claim 16, wherein said embedding said at least two unique identifiers into at least two data fields of said copyright protected frame-based work comprises:
embedding said at least two unique identifiers into an ID3V2 tag of at least one corresponding frame of a MP3 file.

18. The computer-implemented method of claim 16, wherein said transmitting said encoded copyright protected frame-based work comprises:
transmitting said encoded copyright protected frame-based work to a device, wherein said device determining if said copyright protected frame-based work is non-counterfeit by verifying said at least two unique identifiers.

19. A computer-implemented method of enhancing copyright revenue generation for a copyright protected work, said method comprising:

selecting an audio frequency not usually perceived by a listener of said copyright protected work, wherein said copyright protected work is a frameless work at a computer;

encoding copyright and playback management information within said selected audio frequency not usually perceived by a listener of said copyright protected work at said computer, wherein said encoding copyright and playback management information comprises:

embedding a copyright registration number for an underlining sound recording corresponding to said copyright protected frameless work; and embedding a copyright registration number for an underlining composition corresponding to said copyright protected frameless work;

transmitting said encoded copyright protected frameless work at said computer; and ensuring appropriate payment of entitled copyright royalties of said copyright protected frameless work based at least in part on said encoded copyright and playback management information.

\* \* \* \* \*